No. 714,158. Patented Nov. 25, 1902.
W. F. DAWSON.
OIL GUARD FOR COMMUTATORS.
(Application filed Apr. 23, 1902.)

(No Model.)

Witnesses:
George A. Mouton.
Helen Alford.

Inventor
William F. Dawson,
by Albert G. Davis
Att'y

UNITED STATES PATENT OFFICE.

WILLIAM F. DAWSON, OF SCHENECTADY, NEW YORK, ASSIGNOR TO GENERAL ELECTRIC COMPANY, A CORPORATION OF NEW YORK.

OIL-GUARD FOR COMMUTATORS.

SPECIFICATION forming part of Letters Patent No. 714,158, dated November 25, 1902.

Application filed April 23, 1902. Serial No. 104,291. (No model.)

*To all whom it may concern:*

Be it known that I, WILLIAM F. DAWSON, a citizen of the United States, residing at Schenectady, county of Schenectady, State of New York, have invented certain new and useful Improvements in Oil-Guards for Commutators, (Case No. 2,506,) of which the following is a specification.

This invention relates to dynamo-electric machines, and especially to generators connected directly to steam-engines or other prime movers. In these machines serious trouble frequently occurs, owing to the leaking of oil from the shaft-bearings, eccentrics, crank-pins, or other lubricated parts and its working into the commutator, where it causes the insulation to deteriorate, so that in time the machine burns out. The creeping of the oil into the commutator is owing to the centrifugal force of the rotating parts and the outward radial suction of air due to the fan action of the commutator-leads and armature-spider.

My invention aims to divert the oil in its passage to the commutator and throw it by centrifugal force away from the machine.

Figure 1:
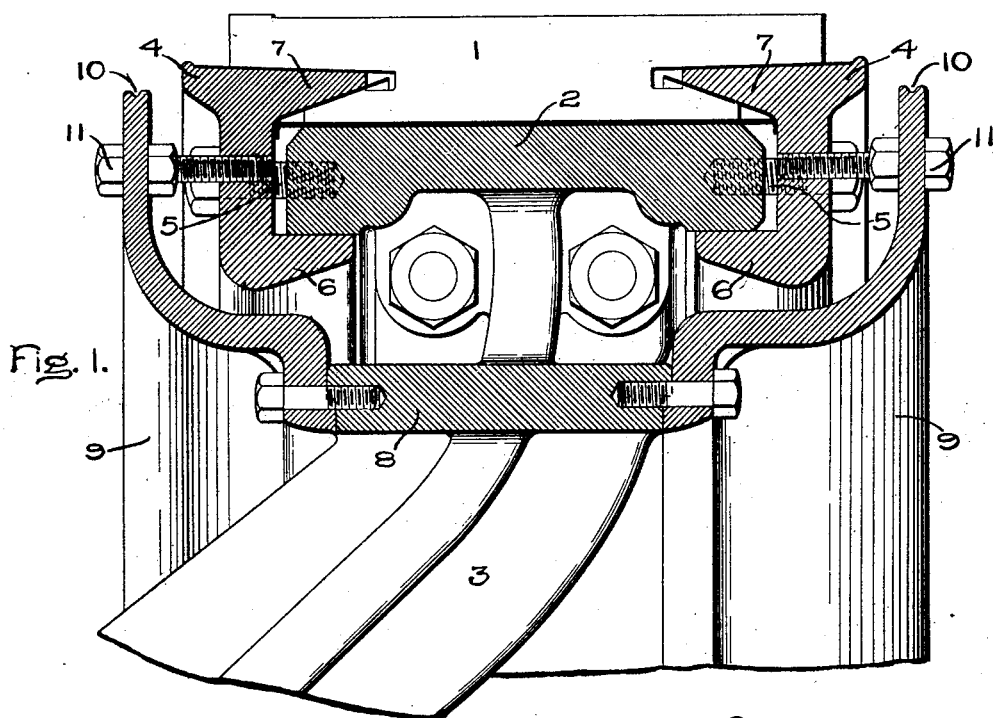
Figure 2:
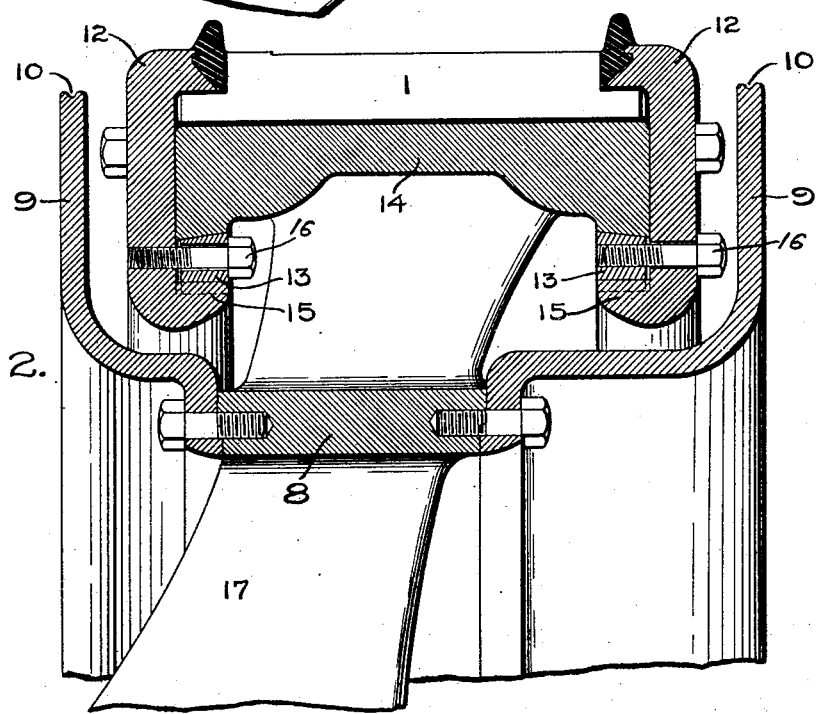

In the accompanying drawings, Figure 1 is a cross-section of a certain construction of commutator embodying my invention. Fig. 2 is a similar view of a modification.

Referring first to Fig. 1, the commutator-segments 1 are mounted on the cylindrical rim 2 of a spider, one of whose arms is shown at 3. The segments are clamped to the rim by clamping-rings 4, located one at each end of the segments and forced against them by bolts 5 entering said rim. The clamping-rings have cylindrical inner flanges 6, fitting the cylindrical inner surface of the rim, and beveled outer flanges 7, fitting beveled grooves in the ends of the commutator-segments. Insulation is interposed between the segments and the rim and clamping-rings, as indicated by the heavy black lines.

Ordinarily the oil follows out along the spider-arms and works through the joints between the flanges 6 and the rim, and so gains access to the commutator. This operation is aggravated by the fact that the clamping-rings are made segmental to facilitate repairing the commutator, thus leaving wide radial joints between the ends of the ring-segments through which oil can pass.

My invention consists, first, in a barrier cast integral with the spider-arms and consisting of a web 8, concentric with the shaft and extending from arm to arm entirely around the spider. To each edge of this web is bolted an integral annular flange 9, extending outwardly to a plane of revolution beyond the end of the commutator and terminating in a smooth edge, preferably having a groove 10 in it. The flange may be steadied by adjusting-bolts 11 entering the clamping-rings 4. The joints between the flanges and the web are preferably rabbeted and are machined to give a close fit. The oil escaping along the arms of the spider will be stopped by the web 8 and compelled to flow out over the flanges, from whose edges it flies off by centrifugal force in lines which carry it clear of the commutator. Any oil remaining on the edges of the flanges when the machine stops will not be able to run down inside the flanges, but will be caught in the grooves 10 and will follow them around to the lower side of the flanges and drop off.

In the older style of commutator (shown in Fig. 2) the segmental rings 12 are movable readily to clamp the commutator-segments 1 by means of short wedge-blocks 13, inserted at intervals between the rim 14 of the spider and the inner flange 15 of the ring and adjusted by screw-bolts 16. The oil following out along the spider-arms 17 finds easy access between the ends of the wedge-blocks to the joints between the rim and the clamping-rings, and so to the insulation by which the commutator-segments are surrounded. In this style of machine I use the same barrier-web 8 on the spider-arms and the curved flanged rings 9 with rabbeted joints and grooved edges.

By means of this simple addition to the commutators of dynamo-electric machines I am able to almost wholly exclude oil from the commutator.

What I claim as new, and desire to secure by Letters Patent of the United States, is—

1. The combination with the commutator of a dynamo-electric machine, of an annular oil-guard attached to the commutator-support and extending radially outward to a plane of revolution beyond said commutator.

2. The combination with the commutator of a dynamo-electric machine, of a flanged ring attached to the commutator-support and extending outward to a plane of revolution beyond the end of said commutator.

3. The combination with the commutator of a dynamo-electric machine, of a flanged ring connected with the commutator-support by a rabbeted joint, and extending outward to a plane of revolution beyond the end of said commutator.

4. The combination with the commutator of a dynamo-electric machine, of an annular oil-guard attached to the commutator-support and having a grooved edge lying in a plane of revolution beyond the end of said commutator.

5. The combination with the commutator of a dynamo-electric machine, of a spider supporting the same, a web integral with the spider-arms and concentric with the shaft, and an annular oil-guard attached to said web.

6. The combination with the commutator of a dynamo-electric machine, of a spider supporting the same, a web integral with the spider-arms and concentric with the shaft, and an annular oil-guard attached to said web by a rabbeted joint and having a grooved edge.

7. Means for protecting the commutator of a dynamo-electric machine from oil, consisting of a web integral with the arms of the spider supporting said commutator, and a flanged ring fastened to said web by a tight joint and extending out to a plane of revolution beyond the end of the commutator.

In witness whereof I have hereunto set my hand this 21st day of April, 1902.

WILLIAM F. DAWSON.

Witnesses:
BENJAMIN B. HULL,
HELEN ORFORD.